United States Patent Office 3,239,497
Patented Mar. 8, 1966

3,239,497
METHOD OF PREPARING A POLYMERIZATION CATALYST FOR OLEFINS AND OLEFIN POLYMERS
Kazuo Machida and Takeshi Isobe, Tokuyama-shi, Yamaguchi-ken, Japan, assignors to Tokuyama Soda Kabushiki Kaisha, Tokuyama-shi, Yamaguchi-ken, Japan, a corporation of Japan
No Drawing. Filed Oct. 10, 1962, Ser. No. 229,740
Claims priority, application Japan, Oct. 10, 1961, 36/36,755
11 Claims. (Cl. 260—93.7)

This invention relates to a method of preparing a catalytic composition that can polymerize olefins into a solid polymer and to a method of using such a catalyst and rendering olefins into a substantially solid, high molecular polymer.

In our copending U.S. patent applications U.S. Serial Nos. 834,675, and now abandoned, and 152,715, we have disclosed methods of preparing solid polymers of high molecular weight by polymerizing olefins in the presence of a catalyst. In brief, the gist of the former resides in a method which comprises effecting the polymerization of olefins while using a catalyst obtained by reacting in an atmosphere of hydrogen a halide of a metal of low valency of a metal of Groups IVa–VIa of Mendeléeff's periodic table (hereinafter to be referred to as merely the periodic table) with a reducing agent. The gist of the latter, on the other hand, resides in a method of effecting the polymerization of olefins using a catalyst obtained either by the procedure comprising (A) a halide of a metal of low valency of a metal of Groups IVa–VIa of the periodic table with (B) a compound having at least one cyclopentadiene ring in its molecule in an amount of from 0.03 to 0.3 mol per each mol of the metal halide (compound (B), limited to a compound having at least one cyclopentadiene, is intended to cover not only cyclopentadiene itself but also the metallic derivatives thereof, a polycyclic compound containing a cyclopentadiene ring in its molecule, and metallic derivatives thereof), and effecting the reaction in the presence of (C) a reducing agent in an atmosphere of hydrogen; or by the procedure comprising effecting the reaction in an atmosphere of hydrogen after adding, or while adding the aforesaid compound having at least one cyclopentadiene ring in its molecule and reducing agent to said halide of a metal of low valency.

The method of the present invention concerns an olefinized catalyst composition of a halogenated metal which has been obtained either by treating a halide of a metal of low valency of a metal of Groups IVa, Va and VIa of the periodic table with a compound having at least one cyclopentadiene ring in its molecule in an amount of from 0.03 to 0.3 mol per each mol of said metal halide, and thereafter effecting the reaction in the presence of a reducing agent in an atmosphere of olefin gas, or by effecting the reaction in an atmosphere of olefin gas after adding, or while adding, the aforesaid compound having at least one cyclopentadiene ring in its molecule and reducing agent to said halide of a metal of low valency. It also concerns a method of polymerizing olefins in which said catalyst is used.

As a suitable halide of a metal of low valency of a metal of Groups IVa, Va and VIa of the periodic table, which is used as one component of the aforesaid polymerization catalyst composition, included are, for example, the halides of titanium, zirconium, vanadium, etc., of low valences. Also suitable is the titanium trihalide composition obtained by effecting the pyrolysis of a double salt of titanium trihalide and an alkali metal halide formed by reducing a titanium tetrahalide with an alkali metal, the alloys thereof or amalgam.

In the method of preparing the titanium trihalide composition is given in greater detail, it consists of suspending metallic sodium in an inert solvent and while heating with stirring adding thereto titanium tetrachloride dropwisely. After the reaction, when the unreacted titanium tetrachloride and the solvent is separated, a complex salt of titanium trichloride is obtained which when dried is a green powder. This does not possess the catalytic activity in the method of the present invention. When the pyrolysis of this is effected in an inert atmosphere at above 300° C., a purple titanium trichloride composition is obtained.

In consequence of having researched into the mechanism of operation of these polymerization catalysts of olefins, we found that the mechanism of operation of the foregoing catalyst composition which starts from the aforesaid titanium trihalide was entirely different from that conceivable in case of the conventional Ziegler-Natta type catalyst, and thus the present invention was achieved. Namely, we succeeded in obtaining a polymerization catalyst composition having excellent activity by treating in an atmosphere of olefin gas instead of an atmosphere of hydrogen as described hereinbefore.

When a titanium trihalide or said composition (e.g., including the aforesaid titanium trihalide obtained by the pyrolysis of a complex salt) and a compound having at least one cyclopentadiene ring in its molecule in an amount of from 0.03 to 0.3 mol per each mol of the metal halide are treated at suitable pressure and temperature conditions together with such as a Group I metal in an atmosphere of olefin gas, the absorption of olefin gas occurs, whereupon a catalyst composition containing said olefin is obtained. When this is allowed to stand further in a sufficient atmosphere of olefin gas, the polymerization reaction proceeds whereby high polymeric materials of olefins are obtained.

It is known from U.S. Patent 2,992,212 that when titanium trichloride is mixed with titanium dimethyl bis(cyclopentadiene) in a molar ratio of 1:0.25 to 1:100, it is useful as a polymerization catalyst of propylene at between $-50°$ and $170°$ C. The preparation of a Ziegler-Natta type catalyst in the presence of olefin is also known from the prior publications.

However, it has not been known at all heretofore that the reduced metallic composition obtained by the reduction of titanium trihalide or a composition thereof with a reducing agent such as metallic sodium in an atmosphere of olefin gas was useful as a polymerization catalyst and that it had superior catalytic activity.

According to this invention, the results obtained are most remarkable when a halide of a metal of low valency of the metals of Groups IVa, Va and VIa of the periodic table, for example, titanium trihalide, zirconium trihalide, vanadium trihalide, etc. (the halogene include chlorine, bromine, iodine, etc.; the term "low valency" is meant a valency that is lower than the maximum of said metal) is reduced with heating by means of an alkali metal in an atmosphere of olefin gas and the addition of the olefin is effected in its reduced state.

While with respect to the reaction mechanism of the compounds having at least one cyclopentadiene ring in their molecules that are added in this case, there are points that are not clarified as yet, the effects on the difficulty or ease with which the addition reaction of olefins can be carried out as well as upon the catalytic capacity thereof are marked depending upon the difference in form of the starting material of the halides of metals of Groups IVa, Va and VIa of the periodic table (e.g., the difference in the method of obtaining titanium trihalide from titanium tetrahalide), etc. Again, since the presence of the saturated halides of the respective metals impedes greatly the reactivity of the halide of a metal of low valency and also has the defect that the addition reaction of olefin is rendered impossible of being carried on, the addition of a compound having at least one cyclopentadiene ring in its molecule in an amount of from 0.03 to 0.3 mol per each mol of the metal halide is useful because the adverse effects on said catalyst due to the small amount of saturated halides contained are very effectively restrained whereby not only the catalytic capacity for polymerizing olefines and dien compounds of the foregoing halide of a metal is fully stabilized but also its catalytic activity is enhanced.

Heretofore, it was very difficult to obtain in high purity a halide of titanium of low valency. Furthermore, to obtain a metallic compound in the most effective state of reduction for a catalyst composition was also difficult. When a small amount of titanium tetrahalide is contained thus, the amount absorbed of the olefin during the preparation of the catalyst falls abruptly and the catalytic activity also falls precipitously. For satisfying the absorption of the olefin during the preparation of the catalyst and to obtain a catalyst excelling in catalytic activity, an additive is necessary that is effective in acting on the saturated metallic halide compound to convert the same to a state harmless to catalytic activity as well as to efficiently further its catalytic activity and stability which are affected by such differences as the physical properties of the halides of a metal of low valency. And it was made evident that as said additive the compounds having a cyclopentadiene ring in the molecule and alcohols were especially effective.

The compounds having a cyclopentadiene ring that are used in the method of this invention include cyclopentadiene, sodium cyclopentadienyl, potassium cyclopentadienyl, magnesium cyclopentadienyl, aluminum cyclopentadienyl, biscyclopentadienyl titanium dichloride, biscyclopentadienyl titanium dibromide, biscyclopentadienyl zirconium chloride, ferrocene, bismethyl cyclopentadienyl zirconium dichloride, vanadium dichloropentadienyl, etc. As the polycylic compounds having a cyclopentadiene ring therein, included are dicyclopentadiene, indene, fluorene and the metallic derivatives thereof. These compounds may be added together with the halide of a metal of low valency and the reducing agent when preparing the catalyst, or advantageously they may be, for example, added first to the halide of a metal of low valency or a composition thereof and after having been given a suitable heat treatment be treated in an atmosphere of olefin gas together with the reducing agent. Even though these additives are added greatly in excess, the catalytic activity is hardly affected at all; instead, it tends to reduce the activity. Hence, in general, the use in the range of 0.03-0.3 mol of these additives to each mol of the halide of said metal of low valency is effective for furthering the activity and stability of the catalyst obtained regardless of the method used in the preparation of the halide of said metal of low valency.

As the reducing agent, alkali metals, for example, lithium potassium and sodium and the amalgams thereof, are used. The reducing metal may be added at the rate of 0.3-6 mols to each mol of the above mentioned halide of the metal of low valency. In addition, as to their forms, those which have been comminuted and activated or those pulverized to 1-10μ and are in a state of suspension in a solvent are particularly effective as compared with those in the usual form. Hence, there is no restriction as to the form that these metals are used in.

The mechanism of operation of this catalyst is not yet clear. However, when analogized together with the mechanism of operation of the catalyst in case of the reduction and hydrogenation reaction of a halide of titanium of low valency with metallic sodium in an atmosphere of hydrogen gas, it is believed that, for example, when titanium trichloride is brought to a state of reduction with sodium in the presence of olefin gas, a composition represented by the formula $TiCl_2(CH_2=CHR)$, wherein R is, say, hydrogen or an alkyl group, is formed. In this instance, it is presumed that it is not just simply $TiCl_2(CH_2=CHR)$ but that sodium, chlorine and also a compound having a cyclopentadiene ring functions whereby it assumes a certain stabilized catalytic form.

That the catalyst according to this invention is insoluble in hydrocarbon solvents is entirely the same as in the case of the above-mentioned reduced and hydrogenated catalyst, and it differs completely from the conventional alkyl titanium halide type catalyst. It also differs from the Ziegler-Natta type of titanium chloride-alkyl aluminum type of catalyst. Furthermore, that it differs also from the sodium hydride-aluminum chloride-titanium trichloride type catalyst is apparent from the fact that sodium hydride is not present in catalytic system of the present invention.

The various conditions in preparing the catalyst preferably are of the following range. Namely, a reaction temperature of 50-150° C., particularly about 80° C.; a pressure of 1-30 kg./cm.$^2$, about 10 kg./cm.$^2$ being particularly easy to operate with; and a reaction time of 30 minutes to 5 hours, for example, 1½-2 hours being generally easy to operate with. However, one need not necessarily be limited to the foregoing range, since variations are permitted depending on the condition of the starting material for the catalyst as well as other factors.

In general it is preferred that the presence of the solvent during the preparation of the catalyst be in a small amount. If necessary, the use of the olefin in its liquid state is also possible. When the amount of the solvent becomes great, the catalytic activity is markedly reduced. At times, the absorption of olefin hardly ever occurs. Normally, from the operational standpoint a concentration of about 10-20% of the solids portion in the slurry is preferred. On the other hand, at the time of polymerization, since it is preferred that the polymerization reaction be effected in a dilute state of the solvent, it is a general practice to add further the solvent.

The common hydrocarbon solvents are used as the solvent, namely, light oil, normal heptane, benzene, cyclohexane, etc., being used. There is no particular necessity for any special solvents. The addition of a chlorine-containing solvent, powders of transition metals, surfactants and amines has a regulatory action with respect to the absorption of olefin or the catalytic capacity. Thus, the addition in small amounts of the foregoing substance may be made for achieving certain specific purposes.

In the polymerization operations the employment of the conventional polymerization methods is permissible. For instance, polymerization by either the batch method or continuous method is possible. Or, the catalyst preparation vessel may be used, as such, as the polymerization vessel, or the catalyst may be once taken out of the vessel in which it is being prepared and the polymerization carried out in another vessel. For instance, the polymerization is carried out for the prescribed number of hours by introducing olefin under pressure until the specified pressure is reached while maintaining a suitable polymerization temperature, with or without the further addition of solvent. Further, while the catalyst preparation vessel used is not restricted to any particular type such as the ball mill type or the shaker type, that in which pulverizing effects are imparted such as the ball mill type is desirable. The olefins that can be used, inclusive of the time when the catalyst is being prepared, include the α-olefins such as ethylene, propylene, etc. and besides these the dienes such as butadiene, the styrenes, etc. And needless to say the copolymers containing these monomers can also be used.

Finally, as an interesting fact, it can be said that generally the form of the titanium trichloride is not of significance to this catalyst. However, considered from the standpoint of its catalytic activity and the matter of handling ease or difficulty, it is affected greatly by the composition of the titanium trichloride and its method of preparation. For example, the titanium trichloride composition obtained by the pyrolysis of the complex salt of it and an alkali metal is one example of that which is suitable from standpoint of its stability, handling ease, etc.

EXAMPLE 1

To a shaker type autoclave of 1 liter capacity were added in a stream of nitrogen 200 cc. of toluene, 0.2 gram of biscyclopentadienyl titanium dichloride (hereinafter abbreviated as CPT), 1.4 grams of sodium and 3.2 grams of a titanium chloride-sodium composition (prepared as described separately herein, the same method of preparation applying equally hereinafter, and the amount used being indicated in terms of the weight when rendered into titanium trihalide). Then while in an atmosphere of nitrogen (atmospheric pressure) propylene gas in its still state was introduced under a pressure of 8 kg./cm.$^2$ and hereafter by shaking for 1.5 hours at 70° C. the catalyst was synthesized. After cooling, 75 grams of propylene gas was introduced under pressure and the polymerization reaction was effected by shaking for 2 hours at a polymerization temperature of 70° C. and a pressure of about 10 kg./cm.$^2$. After cooling, the contents were taken out and treated with methanolic hydrochloric acid whereby was obtained 70 grams of polypropylene.

*Method of preparing the titanium chloride-sodium composition of Example 1*

Titanium tetrachloride and metallic sodium were used in equimolar quantites (slight excess of the titanium tetrachloride). To a 5000 cc. capacity three-neck flask provided with a condenser-equipped burette and a thermometer were added 100 cc. of toluene and 5.2 grams of sodium which was then heated to about 100° C. with stirring. Into this was added dropwisely 25 cc. of titanium tetrachloride from the burette. After completion of the reaction a greater part of the solvent and the unreacted titanium tetrachloride was separated, following which the product was dried with heating. The foregoing process was carried out in an atmosphere of an inert gas. The product was a green powder. This was then calcined in an atmosphere of an inert gas at about 300° C. whereby was obtained a purple powder.

EXAMPLE 2

Substantially the same procedures were followed as in the previous example, except that instead of CPT, 0.5 gram of sodium cyclopentadienyl was used whereby was obtained 12 grams of polypropylene.

EXAMPLE 3

Titanium trichloride obtained by means of the hydrogen reduction process (using titanium tetrachloride as the starting material) was used. This contained several percent of titanium tetrachloride as an impurity. Substantially the same procedures as in Example 1 were followed whereby a polymer was obtained. In this case, the molar ratio of sodium to titanium trichloride was 3:1; the pressure during the synthesis of the catalyst, 1.5 kg./cm.$^2$; the polymerization time, 2 hours; the quantity of propylene introduced under pressure during polymerization was not measured; the yield of polymer was 72 grams; and the n-heptane residue was 78.3%.

EXAMPLE 4

The catalyst was obtained by following substantially the same procedures as in Example 1. Butadiene was polymerized for 2 hours at 80° C. and a pressure of about 5 kg./cm.$^2$. After cooling, the contents were taken out of the autoclave and by similar treatments as described hereinbefore, 7 grams of a soft polymer having elasticity was obtained.

EXAMPLE 5

Following substantially the same procedures as in Example 1, the catalyst was prepared using ethylene gas. This was transferred to another vessel and after adding further 250 cc. of solvent, ethylene gas was continuously introduced under pressure and the reaction carried out for 1.5 hours at 50° C. and a pressure of 3–5 kg./cm.$^2$ whereby was obtained about 100 grams of highly crystalline polyethylene.

EXAMPLE 6

Following substantially the same procedures as in Example 5 and using during the polymerization operation a mixed gas of 65% ethylene and 35% propylene, the polymerization reaction was carried out for 2 hours at a temperature of 90° C. and a pressure of about 12 kg./cm.$^2$. Then after treating as described hereinbefore, about 30 grams of a solid polymer was obtained, which was a rubbery elastomer of low crystallinity.

EXAMPLE 7

In Example 1, 1.8 grams of potassium was used and in this case the titanium trichloride of Example 3 was used; otherwise the procedures were substantially the same in preparing the catalyst. The polymerization operation was carried out by introducing propylene under pressure into the polymerization vessel and effecting the reaction for 2 hours at a temperature of 70° C. and a pressure of 15 kg./cm.$^2$ whereby was obtained 65 grams of polypropylene.

EXAMPLE 8

Employing the same apparatus as in Example 1 and using 4 grams of vanadium trichloride, 0.1 gram of biscyclopentadienyl vanadium dichloride, 1 gram of metallic sodium and 200 cc. of toluene in the propylene gas atmosphere, the catalyst was synthesized by reacting for 2 hours at 80–100° C. and a pressure of 8 kg./cm.$^2$. This was followed by the continuous introduction under pressure of propylene and reaction for 2 hours at 80° C. and a pressure of 12 kg./cm.$^2$ whereby was obtained, after treating as in Example 1, 20 grams of polypropylene having an average molecular weight of about 100,000.

EXAMPLE 9

The same procedures as in Example 3 was followed, but instead of titanium trichloride 3.0 grams of zirconium trichloride was used. As the additive 0.2 gram of biscyclopentadienyl zirconium dichloride was used. The molar ratio of sodium to zirconium trichloride was the same as that of sodium to titanium trichloride of Example 3. The results obtained were also somewhat similar.

EXAMPLE 10

In Example 5, 3.2 grams of titanium trichloride, 1.4 grams of metallic sodium and 0.3 gram of sodium cyclopentadienyl were used. When the reaction was carried out for 3 hours, about 100 grams of polyethylene was obtained.

EXAMPLE 11

An autoclave of 1 liter capacity was used and in an atmosphere of nitrogen, to 4.3 grams of titanium trichloride was added 2.1 grams of dicyclopentadiene (purity 86%) followed by carrying out the reaction for 1.5 hours at 195–200° C. After cooling, 200 cc. of xylene and 1.9 grams of sodium were added and the reaction was carried out for 1.5 hours at 80° C. while introducing propylene gas under a pressure of 10 kg./cm.$^2$. Then after cooling, 80 grams of propane gas containing 60% propylene was added and the polymerization reaction was carried out for 3 hours at 80° C., followed by washing with a methanolic hydrochloric acid whereby was obtained 33 grams of polypropylene.

Having thus described the nature of the invention, what is claimed is:

1. A method of preparing a polymerization catalyst for olefins and dienes which comprises reacting in an atmosphere of olefin gas and in the presence of an organic solvent, (A) at least one metal halide in which the metal has a valency lower than its maximum value, said metal being selected from the group consisting of Groups IVa, Va and VIa of the periodic table; (B) a compound selected from the group consisting of the transition metal cyclopentadienyl compounds, sodium pentadienyl and dicyclopentadiene in an amount of from 0.03 to 0.3 mol per each mol of said metal halide; and (C) a reducing metal selected from the group consisting of alkali metals and the amalgam thereof.

2. The method of claim 1, characterized in that said halide of a metal of low valency (A) and said compound having at least one cyclopentadiene ring in its molecule (B) are first reacted in an atmosphere of inert gas, after which this reaction product and said reducing metal (C) are reacted in the presence of an organic solvent in an atmosphere of olefin gas.

3. The method of claim 1, characterized in that to said halide of a metal of low valency (A) are added said compound having at least one cyclopentadiene ring in its molecule (B) and said reducing metal (C) and thereafter the reaction thereof is effected in the presence of an organic solvent in an atmosphere of olefin gas.

4. The method of claim 1, characterized in that the reaction is effected in the presence of an organic solvent in an atmosphere of olefin gas while the three components consisting of said halide of a metal of low valency (A), said compound having at least one cyclopentadiene ring in its molecule (B) and said reducing metal (C) are added in small increments until the respective total amounts of these three components have been added.

5. The method in accordance with claim 1 wherein said halide of a metal of low valency (A) is selected from the group consisting of the halides, particularly the chlorides, of titanium, zirconium and vanadium, each of said metals being of low valency.

6. The method in accordance with claim 1 wherein, as said halide of a metal of low valency (A), is used a product comprising principally titanium trichloride obtained by reducing titanium tetrachloride with metallic sodium to first form a complex salt of titanium trichloride and sodium chloride, following which the pyrolysis of said complex salt is effected at above 300° C.

7. The method in accordance with claim 1 wherein said reducing metal (C) is added at the rate of 0.3–6 mols to each mol of said halide of a metal of low valency (A).

8. The method in accordance with claim 1 wherein said reaction is carried out from 30 minutes to 5 hours at a temperature of 30–150° C. under an olefin gas pressure of 1–30 kg./cm.$^2$.

9. A method of polymerizing olefins and dienes which comprises polymerizing a polymerizable, unsaturated compound selected from the group consisting of olefins and dienes at a temperature of 30–150° C. in presence of an inert solvent while using as a catalyst a reaction product obtained by reacting in an atmosphere of olefin gas at a pressure of from 1 to 30 kg./cm.$^2$, and in the presence of an organic solvent, (A) at least one metal halide in which the metal has a valency lower than its maximum value, said metal being selected from the group consisting of Groups IVa, Va and VIa of the periodic table; (B) a compound selected from the group consisting of the transition metal cyclopentadienyl compounds, sodium pentadienyl and dicyclopentadiene in an amount from 0.03 to 0.3 mol per each mol of said metal halide; and (C) a reducing metal selected from the group consisting of alkali metals and the amalgam thereof in an amount of from 0.3 to 6 mols per each mol of said metal halide.

10. A method of polymerizing propylene according to claim 9 in which said olefin is propylene.

11. A method of polymerizing ethylene according to claim 9 in which said olefin is ethylene.

References Cited by the Examiner

UNITED STATES PATENTS

| | | | |
|---|---|---|---|
| 2,827,446 | 3/1958 | Breslow | 260—94.9 |
| 2,965,626 | 12/1960 | Pilar et al. | 260—94.9 |
| 2,992,212 | 7/1961 | De Butts | 260—93.7 |
| 2,999,086 | 9/1961 | Fasce et al. | 260—93.7 |
| 3,061,602 | 10/1962 | Duck et al. | 260—94.9 |

JOSEPH L. SCHOFER, *Primary Examiner.*